United States Patent [19]
Marceau et al.

[11] 3,850,420
[45] Nov. 26, 1974

[54] GLASS SHEET CARRIER

[75] Inventors: William E. Marceau, Horsham; William G. Bates, Sellersville; Thomas J. Mroczek, Lansdale, all of Pa.

[73] Assignee: Selas Corporation of America, Dresher, Pa.

[22] Filed: Nov. 28, 1973

[21] Appl. No.: 419,704

[52] U.S. Cl............... 269/46, 105/150, 198/180, 214/1 S, 269/55, 294/118
[51] Int. Cl......... B23g 1/20, B23g 3/00, B66c 1/44
[58] Field of Search...... 105/150; 198/180; 214/1 S; 269/46, 55; 294/87 R, 118

[56] References Cited
UNITED STATES PATENTS

| | | | |
|---|---|---|---|
| 1,405,757 | 2/1922 | Clark | 105/150 |
| 2,103,850 | 12/1937 | Hinsey | 269/55 |
| 2,423,249 | 7/1947 | Minton et al. | 214/1 S X |
| 2,696,232 | 12/1954 | Johnson | 269/55 |
| 2,710,493 | 6/1955 | Glynn | 214/1 S X |
| 3,273,933 | 9/1966 | Jochim | 294/118 |

Primary Examiner—M. Henson Wood, Jr.
Assistant Examiner—Howard Beltran

[57] ABSTRACT

The structure constitutes a carrier for glass sheets to be used in a tempering operation. The glass supporting tongs are attached through a horizontal cable to the carriage so that they can move relative to each other and thus keep uniform the pressure the tongs exert upon the glass.

4 Claims, 3 Drawing Figures

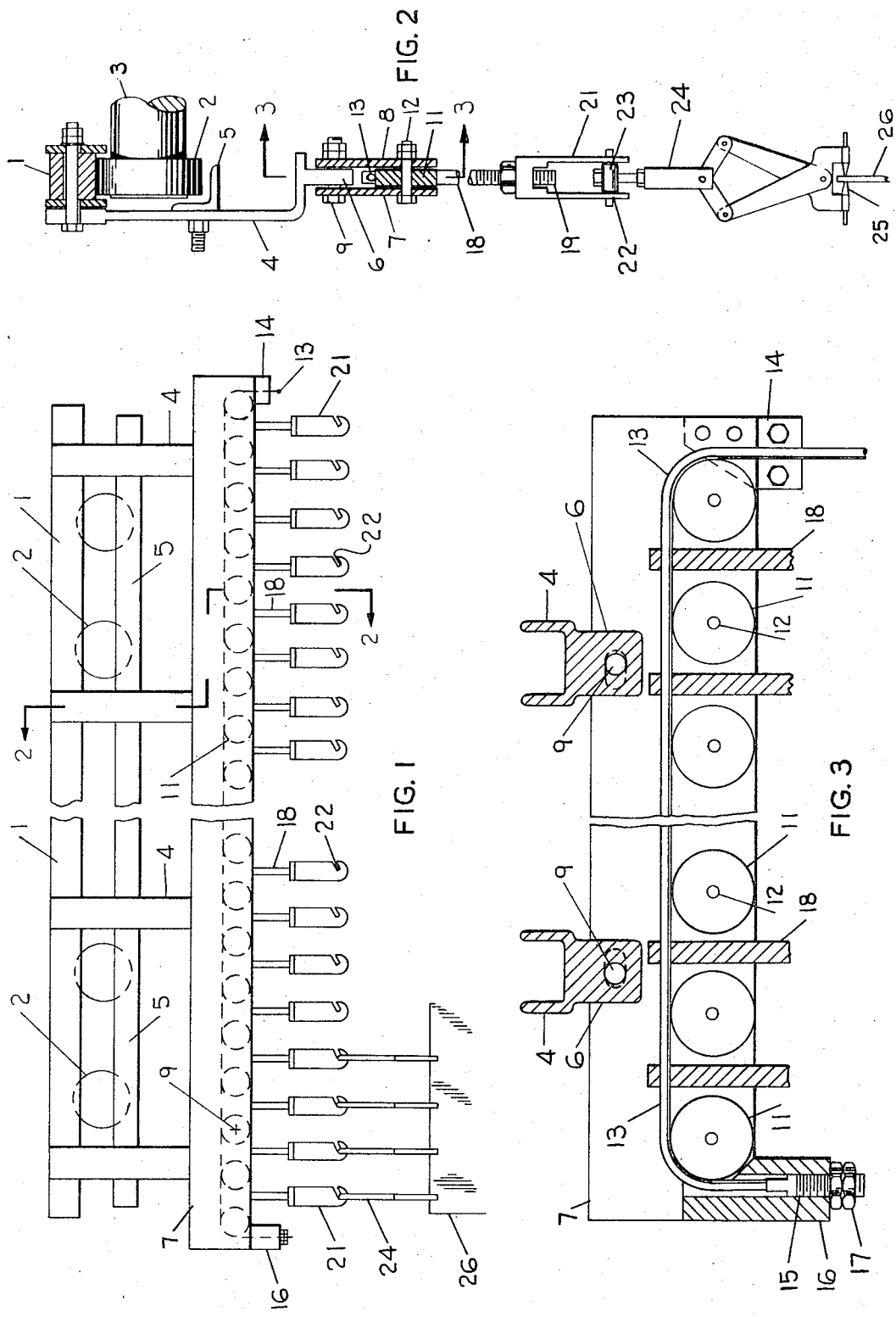

GLASS SHEET CARRIER

BACKGROUND AND SUMMARY

The present invention relates to glass tempering and more particularly to a carriage upon which a sheet of glass is supported while it is moved through a tempering operation.

In the tempering of large sheets of glass, the glass is hung from tongs on a carrier and conveyed from a loading station through a furnace and a quench to an unloading station. When a number of tongs are used to hold the sheet, as is usually the use, it is difficult if not impossible to have each tong exert the same pressure on the glass. Some grip lightly while the pressure of others is or can be great enough to break or permanently damage the glass. This can be due to minute variations in the thickness of the glass, tong point wear or setting, or other reasons. The net effect is a high percentage of breakage that is due to mechanical, rather than thermal causes.

It is an object of the invention to provide apparatus for suspending glass sheets during a tempering operation that will reduce the strains to which the glass is subjected as it is being moved and treated during a tempering cycle.

It is a further object of the invention to provide a flexible support for a sheet of glass as it is being tempered that will inherently compensate for shifting of the glass load and minor warping of the glass as tempering takes place.

In practicing the invention there is provided a carriage including an elongated bar movable along a path. Attached to the bar is a cable that passes over a series of rollers. Between each roller and attached to the cable is a connecting rod to which a tong assembly is attached. This mounting permits the tongs to move both laterally and vertically to compensate for even minute variations in the glass while it is being moved from one location to another during the treatment cycle. Such movement is selfcompensating for tonging errors, conveying problems, and nonuniform heating.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated and described a preferred embodiment of the invention.

IN THE DRAWINGS

FIG. 1 is a view of the carrier,

FIG. 2 is a section taken on line 2—2 of FIG. 1, and

FIG. 3 is a section taken on line 3—3 of FIG. 2.

DETAILED DESCRIPTION

Referring to the drawing, there is shown the glass sheet carrier of the invention. The carrier includes a main supporting rail that rides through a path in the tempering equipment on rollers 2 supported on fixed shafts 3. A number of hangers 4 are rigidly attached to and extend downwardly from rail 1. Two more hangers are rigidly connected together by retainers 5 to, in effect, form a series of frames to help maintain the entire frame of the carrier rigid as it is moved through its path.

Each hanger 4 is provided with a lug 6. A pair of elongated members 7 and 8 are mounted in spaced apart relation on the lugs 6 by bolts 9. The members are slightly longer than the largest glass sheet that will be handled, and will expand somewhat as they are carrying glass sheets through the tempering apparatus. In order to permit this expansion to take place without straining or warping the carriage, slots are provided in members 7 and 8 through which the bolts 9 extend. Thus, the actual glass supporting members can expand and contract without putting a strain upon the main frame.

A plurality of spaced rollers 11 are rotatably mounted on bolts 12 extending between members 7 and 8. These rollers support a cable 13 that rests on their upper edges. One end of the cable is rigidly held in place by a clamp 14. The other end has threaded member 15 attached to it and extends through a cable holder 16. The tension of the cable can be adjusted by nuts 17.

A connecting rod 18 is loosely threaded on the cable 13 between each roller 11. The lower end 19 of the rod is threaded and has adjustably mounted on it a yoke 21. Each leg of the yoke has a slot 22 in it, which slots receive the ends of a supporting member 23 for a conventional glass tong 24. As is usual, the points 25 of the tong grip between them the edge of a glass sheet 26.

In preparing the carriage for operation, the various structural parts are first assembled. Cable 13 is then threaded in place with a connecting rod 18 and extending downwardly on it between each roller 11. The cable is then pulled tight and clamped. Nuts 17 are adjusted to put the cable under sufficient tension so that the length of cable supporting each connecting rod between the rollers is straight.

Yokes 21 are threaded on the lower ends of rods 18 and the tongs hooked to the yokes. These parts are provided with adjustments so that the tongs can be located with the points in a horizontal line and will thus grip the glass at the same distance from the edge.

The construction as a whole is such that the tongs and their supports can move individually relative to each other in any direction. Thus, the tongs can give as the carriage is moved and when the glass is warped. This movement lets the tong points of each tong continue to grip the glass with a uniform force. The cable acts as a shock absorber to reduce the effect of shock loading and sudden stops and starts of the carrier. In addition, the cable is insensitive to differential expansion and merely redistributes the load as warping of the glass and shifting of the parts takes place. This redistribution insures that the various tongs will exert substantially the same force on the glass. Thus, the probability of damage to the glass by varying and uneven tong force during the heating and quenching cycles is minimized.

While in accordance with the provisions of the Statutes we have illustrated and described the best form of embodiment of our invention now known to us, it will be apparent to those skilled in the art that changes may be made in the form of the apparatus disclosed without departing from the spirit and scope of the invention set forth in the appended claims, and that in some cases certain features of our invention may be used to advantage without a corresponding use of other features.

What is claimed is:

1. A sheet glass carrier comprising an elongated rigid frame, an elongated flexible element, means to attach said element by its ends at spaced points on said frame, thereby to provide a length of said element extending along said frame, a plurality of spaced supports on said frame under and engaging the length of said flexible element to keep it substantially straight, rods loosely mounted on and depending from said element between adjacent supports and a pair of glass tongs mounted on and depending from each rod.

2. The glass carrier of claim 1 including means to mount said carrier for movement along a horizontal path, and means to adjust said tongs on said rods to position said tongs at the same elevation horizontally.

3. The glass carrier of claim 1 in which the flexible element is a cable.

4. The glass carrier of claim 3 in which the attaching means for said cable positions the cable horizontally, and including adjustable means to attach said tongs to said rods whereby said tongs can be positioned in a horizontal line.

* * * * *